United States Patent [19]
Akemakou

[11] Patent Number: 6,072,257
[45] Date of Patent: Jun. 6, 2000

[54] DUAL EXCITATION ELECTRICAL MACHINE, AND ESPECIALLY MOTOR VEHICLE ALTERNATOR

[75] Inventor: Dokou Antoine Akemakou, Vitry sur Seine, France

[73] Assignee: Valeo Equipements Electriques Moteur, Creteil, France

[21] Appl. No.: 09/236,252

[22] Filed: Jan. 25, 1999

[30] Foreign Application Priority Data

Jan. 26, 1998 [FR] France .................................. 98 00780

[51] Int. Cl.⁷ ..................................................... H02K 1/00
[52] U.S. Cl. ........................... 310/191; 310/263; 310/261; 310/269; 310/181; 310/180; 310/179; 310/156
[58] Field of Search ..................................... 310/191, 263, 310/261, 269, 181, 180, 179, 156

[56] References Cited

U.S. PATENT DOCUMENTS

| | | | |
|---|---|---|---|
| 4,745,312 | 5/1988 | Nagasaka | 310/49 R |
| 4,978,878 | 12/1990 | Dijken | 310/268 |
| 5,663,605 | 9/1997 | Evans et al. | 310/181 |
| 5,747,909 | 5/1998 | Syverson et al. | 310/156 |
| 5,753,989 | 5/1998 | Syverson et al. | 310/114 |
| 5,825,116 | 10/1998 | Ishikawa | 310/263 |
| 5,864,198 | 1/1999 | Pinkerton | 310/266 |

FOREIGN PATENT DOCUMENTS

| | | |
|---|---|---|
| 394 528 | 10/1990 | European Pat. Off. . |
| 0 707 374 | 4/1996 | European Pat. Off. . |
| 41 39 843 | 6/1993 | Germany . |
| 1173495 | 8/1985 | Russian Federation . |
| 96 30992 | 10/1996 | WIPO . |

OTHER PUBLICATIONS

Patent Abstracts of Japan, vol. 018, No. 109 (E–1513), Feb. 22, 1994 & JP 05 304752 A (Fuji Electric Co Ltd), Nov. 16, 1993.

French Search Report dated Oct. 29, 1998.

Primary Examiner—Nestor Ramirez
Assistant Examiner—Thanh Lam
Attorney, Agent, or Firm—Morgan & Finnegan, LLP

[57] ABSTRACT

A flux commutating electrical machine includes a stator and a rotor. The rotor selectively establishes closed magnetic circuits around sections of the armature coils. Excitation permanent magnets establish a magnetic flux closing on itself in a circumferential direction and excitation coils establish a localized variable magnetic flux in an opposite direction to that of the flux produced by the magnets. Each magnet is housed in a first rotor part defining a first pair of rotor poles, and the coils are disposed around a second rotor part ends of which define a second pair of poles. The rotor has between the adjacent first and second rotor parts third rotor parts forming with the first and second parts a circumferential magnetic conduction path.

8 Claims, 3 Drawing Sheets

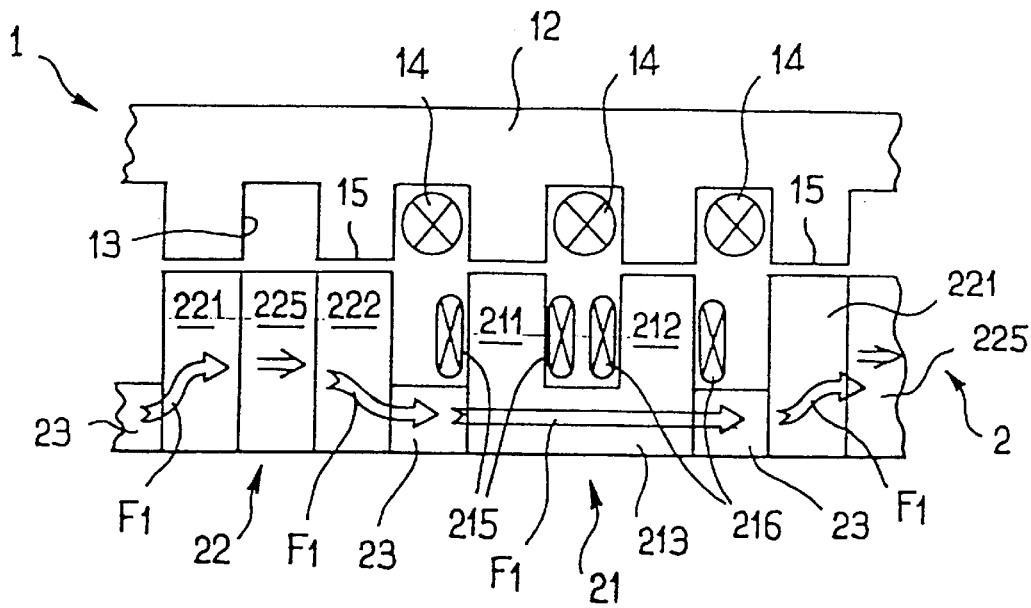
FIG_1a
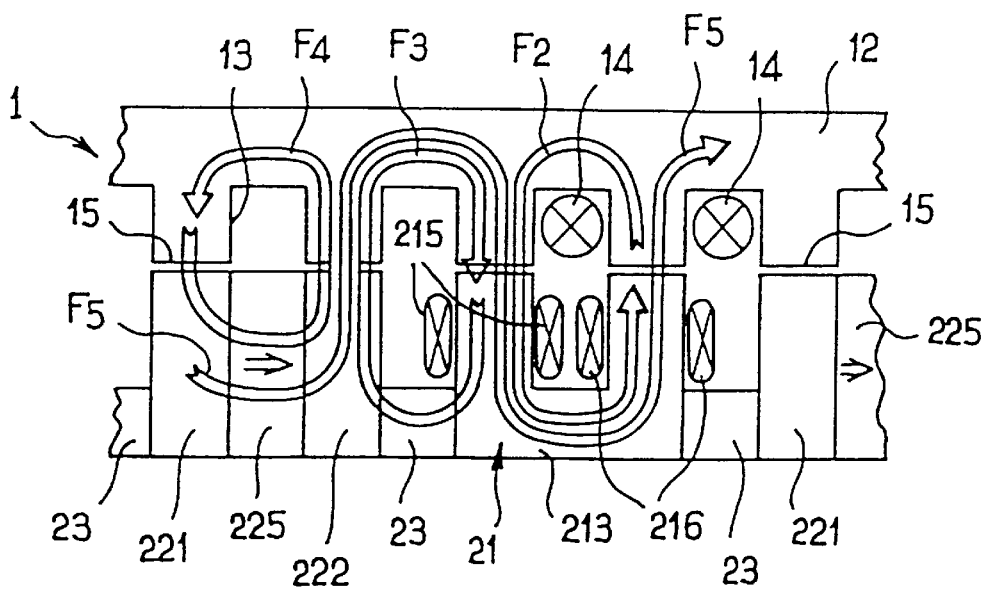
FIG_1b

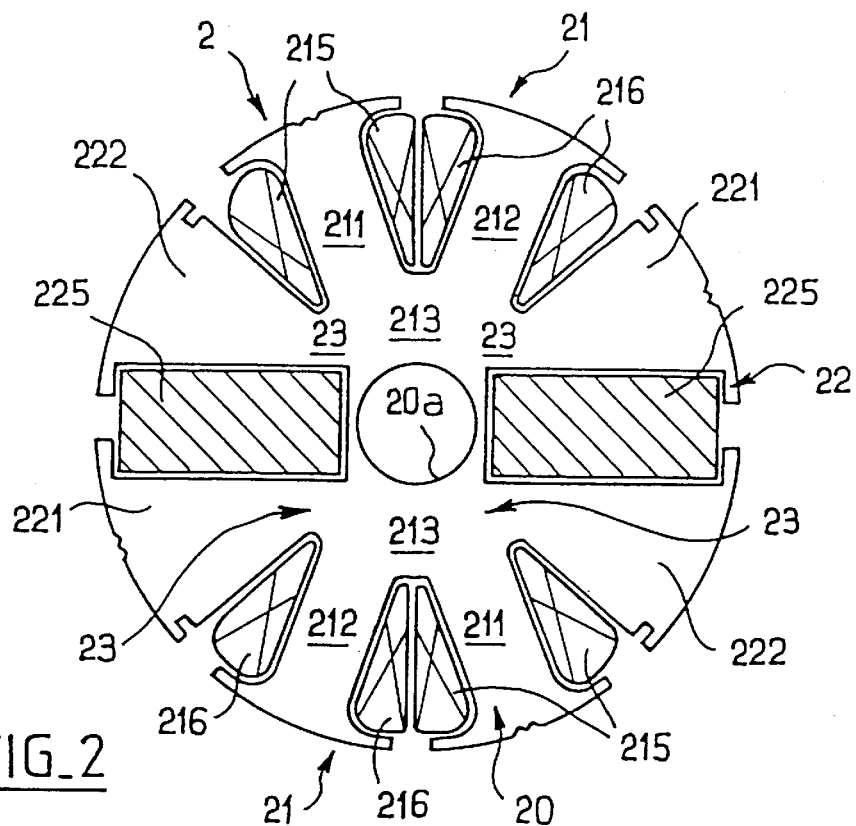
FIG_2
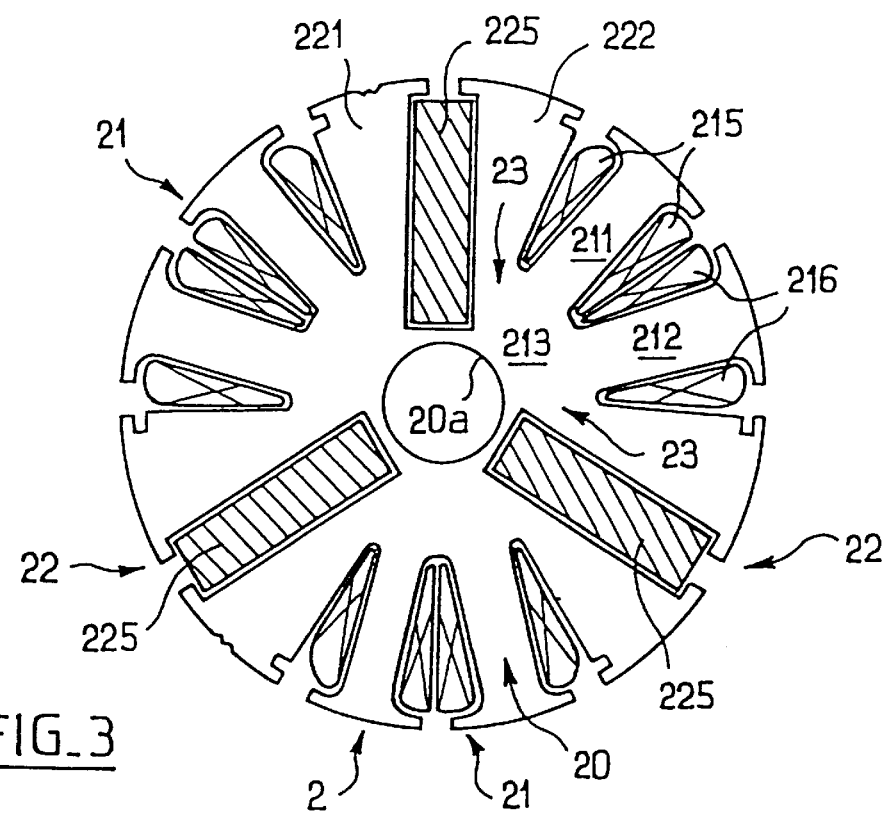
FIG_3

DUAL EXCITATION ELECTRICAL MACHINE, AND ESPECIALLY MOTOR VEHICLE ALTERNATOR

FIELD OF THE INVENTION

This invention relates to rotating machines such as motor vehicle alternators.

BACKGROUND OF THE INVENTION

The single-phase or multiphase generator constituting the conventional motor vehicle alternator generally has a stator within which rotates a rotor carrying an excitation coil. The coil is connected to brushes in contact with two slip rings on a projecting part of the rotor shaft.

EP-A-0 707 374 discloses rotating machines in which, for improved efficiency, the rotor excitation field is produced by permanent magnets and by coils (the expression "mixed excitation" is generally used), and in which the current delivered by the armature is controlled by excitation coil switching means which selectively reverse the excitation direction to reduce or even substantially eliminate the flux from the magnets.

This need to reverse the direction of the excitation current imposes the use of a so-called "H" semiconductor switching bridge, which is costly and adds to the unit cost of the machine.

DISCUSSION OF THE INVENTION

An object of the invention is to overcome the above drawbacks and to propose a machine, in particular a rotating machine such as an alternator, with mixed excitation and in which the output current can be regulated by varying unidirectional excitation by coils, and in particular by varying excitation by coils between an essentially zero value and a maximum value to deliver an essentially zero energy and a maximum energy, respectively.

Another object of the invention, in a machine of the above kind, is to reduce the number of magnets required for a given number of rotor poles without leading to any imbalance between the level of excitation by magnets and the level of excitation by coils.

Accordingly the invention proposes a flux commutating electrical machine including a stator and a rotor wherein the stator includes at least one armature coil housed in at least one pair of notches, the rotor includes means for selectively establishing closed magnetic circuits around sections of the armature coil(s) including at least one excitation permanent magnet adapted to establish a magnetic flux closing on itself in a circumferential direction of the rotor and at least one excitation coil adapted to establish a localized variable magnetic flux in an opposite circumferential direction to that of the flux produced by the magnets, the magnet or each magnet is housed in a first rotor part defining a first pair of rotor poles, the coil is or the coils are disposed around a second rotor part ends of which define a second pair of rotor poles and the rotor has between the adjacent first and second rotor parts third rotor parts forming with the first and second parts a circumferential magnetic conduction path.

The machine in accordance with the invention has the following preferred but non-limiting features:

- the second rotor part or each second rotor part has two excitation coils adapted to create magnetic fluxes one of which is directed towards the interior of the rotor and the other of which is directed towards the exterior of the rotor.
- the rotor has along its periphery an alternating series of first parts and second parts.
- the second rotor part or each second rotor part is generally U-shape and receives an excitation coil on each of its two branches.
- the third rotor parts are at a distance from the rotor poles and extend a radial distance significantly less than the radius of the rotor.
- the first, second and third rotor parts are defined by a single core.
- the rotor is formed by at least two separate yoke elements between respective pairs of magnets and joined together by the magnets.

The invention further proposes a machine as defined hereinabove constituting a motor vehicle alternator.

Other aspects, aims and advantages of the invention will appear more clearly on reading the following detailed description of preferred embodiments of the invention which is given by way of non-limiting example only and with reference to the accompanying drawings.

BRIEF DESCRIPTION OF THE DRAWINGS

FIG. 1a is a diagrammatic developed view of a rotor and stator system of a rotating machine constituting a first embodiment of the invention in a state of non-excitation of the field coils.

FIG. 1b is a view similar to FIG. 1a in a state of excitation of the field coils.

FIG. 2 is a diagrammatic view in cross-section of a rotor and stator system of a multiphase machine in accordance with the invention.

FIG. 3 is a diagrammatic developed view of a rotor and stator system of a rotating machine constituting a second embodiment of the invention.

DESCRIPTION OF PREFERRED EMBODIMENTS OF THE INVENTION

Figure 4:
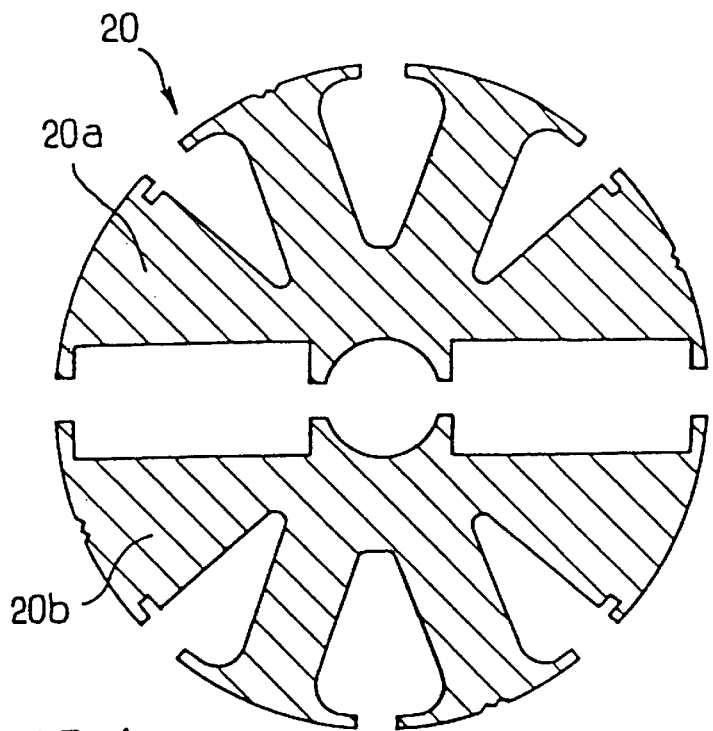
FIG. 4 is a diagrammatic view in cross-section of one embodiment of the core of the rotor from FIG. 2.

Referring first to FIGS. 1a and 1b, there is shown diagrammatically and in developed form part of a stator 1 and the corresponding part of a rotor 2 of a single-phase or multiphase electrical machine in accordance with the invention, such as an alternator.

The stator 1 has a core 12 defining a continuous annular structure with a plurality of notches 13 on its inside periphery receiving sections of armature coils 14 in a manner that in itself is entirely conventional.

There is an even number of notches 13 which are equi-angularly distributed, leaving poles 15 between them.

The rotor 2 is defined by a succession of ferromagnetic material structures that are either separate or preferably in one piece. The structures are shown as individual structures in FIGS. 1a and 1b to simplify the explanation and comprise a U-shape first structure 21 with two branches 211, 212 the free ends of which define two external projecting poles, the angular pitch of which is equal to that of the poles 15 of the stator in the case of a single-phase machine, and a base 213.

A respective excitation coil 215, 216 is wound around each of the two branches 211, 212, the coils being interconnected to generate two magnetic fluxes in opposite directions, as described in more detail hereinafter.

A plurality of equi-angularly spaced U-shape structures as described above is preferably provided.

Interleaved between the U-shape structures 21 are the same number of permanent magnet structures 22 each comprising a permanent magnet 225 trapped between two ferromagnetic members 221, 222 the faces of which that face towards the stator constitute poles, the poles of the U-shape structures 211 and those of the members 221, 222 being equi-angularly spaced around the outside periphery of the rotor. In the case of a three-phase machine the number of stator notches 13 is three times the number of rotor poles as defined hereinabove.

The structures 21 and 22 are interconnected by ferromagnetic material intermediate members 23 forming magnetic connectors and occupying a radial dimension of the stator (which corresponds to its height in FIGS. 1a and 1b) significantly less than the radial dimension of the structures 21 and 22.

As shown here, the connecting members 23 preferably extend essentially the height of the bases 213 of the U-shaped members 21, leaving above them the space needed for the outer sections of the two excitation coils 215, 216.

Clearly, given the above explanations, the various components of the rotor can be provided in N sets disposed in successive groups, according to the required number of poles.

The behavior of a rotating machine, in this instance an alternator, the operating principle of which is as described hereinabove will now be described with reference to FIGS. 1a and 1b.

Consider first the situation in which there is no excitation current in the excitation coils 215, 216 (FIG. 1a).

In this case the magnetic flux generated by the permanent magnets 225 follows a closed circuit through the members 221, 222, the magnetic connectors 23 and the base part 213 of the U-shape members 21.

As a result this flux, indicated by the arrows F1 in FIG. 1a, is not transmitted to the stator, except possibly to a negligible extent in the form of a leakage flux. The alternator is therefore in a non-excited condition and the stator coils deliver substantially no current.

If current is fed to the excitation coils 215, 216 in a direction such that a downwardly directed magnetic flux is generated in the coil 215 at the upstream end (relative to the flux direction F1) and an upwardly directed magnetic flux is generated in the downstream coil 216, three main fluxes circulate between the rotor and the stator:

a first flux indicated by the arrow F2 flows in the branches 211, 212 and the base 213 of the U-shape member 21 and between two adjacent stator poles, in the anticlockwise direction as shown in FIG. 1b;

a second flux indicated by the arrow F3 flows clockwise via the left-hand branch 211 of the member 21, the magnetic connector part 23 and the member 222 adjacent the magnet 225, and also via the stator between two adjacent poles thereof;

the magnetic flux produced by the permanent magnet 225 encountering at the magnetic connector 23 a flux in the opposite direction (flux F3), this magnet flux circulates at least in part, as described in more detail hereinafter, through the two members 221, 222 adjacent the magnet and via two adjacent stator poles (anticlockwise flux F4);

finally, a complementary homopolar magnetic flux F5 is produced by the magnet 225 and by the excitation coils 215, 216.

In this way a succession of north poles and south poles is created on the rotor 2, enabling the stator coils to deliver a current.

It is important to note here that the amplitude of the rotor current at the level of the rotor coils 215, 216 directly determines a general excitation level of the machine, which varies as a monotonous function of said current.

To be more precise, when there is no rotor current (FIG. 1a) there is no excitation (see above).

On the other hand, if the current in the coils 215, 216 is such that the absolute value of the flux flowing towards the left in the magnetic connectors 23 is equal to that which would be created by the adjacent permanent magnet in the absence of the rotor current, then all of the flux generated by said magnet is diverted towards the stator. The machine is then excited to the maximum and the means provided in the alternator for generating the variable rotor current are such that the current corresponding to the latter situation is a maximum current.

This produces a machine in which, using a unidirectional excitation current varying between zero and a predefined maximum value, an excitation is obtained varying as a monotonous function of the current between zero excitation and a maximum excitation.

It is therefore possible to dispense with any "H" electronic switching bridge or the like which, in the prior art mixed excitation machines, produces a bi-directional current according to the required excitation. This significantly reduces the cost of the switching means, which can comprise a single semiconductor switching device.

Concrete embodiments of the rotor of a machine in accordance with the invention will now be described with reference to FIGS. 2 and 3.

In both cases the ferromagnetic members described with reference to FIGS. 1a and 1b are combined in a single core 20. FIG. 2 shows a rotor with eight poles, two diametrally opposed permanent magnets 225 and two pairs of excitation coils 215, 216.

The ferromagnetic members corresponding to those from FIGS. 1a and 1b are designated by the same reference symbols. The part of the core 20 around a central bore 20a adapted to receive the rotor shaft defines the bases 213 of the U-shaped members 21 and the magnetic connectors 23 which have a small radial dimension between said bore and the bottom of the notches that receive the outer sections of the coils 215, 216.

If the FIG. 2 rotor is for a three-phase alternator the stator has 24, preferably equi-angularly spaced, notches in which the three-phase coils of the stator are fitted.

FIG. 3 shows a rotor with 12 poles, three magnets 225 equi-angularly spaced at 120° and three pairs of excitation coils 215, 216. In this case, for a three-phase machine, a stator with 36, preferably equi-angularly spaced, notches is provided.

Variants of the rotor cores shown in FIGS. 2 and 3 will now be described with reference to FIGS. 4 and 5.

FIG. 4 shows that the core 20 of the rotor is made as two sectors 20a, 20b designed to extend between the two magnets 225 and joined to them at assembly time in order to form a continuous cylindrical structure.

Figure 5:
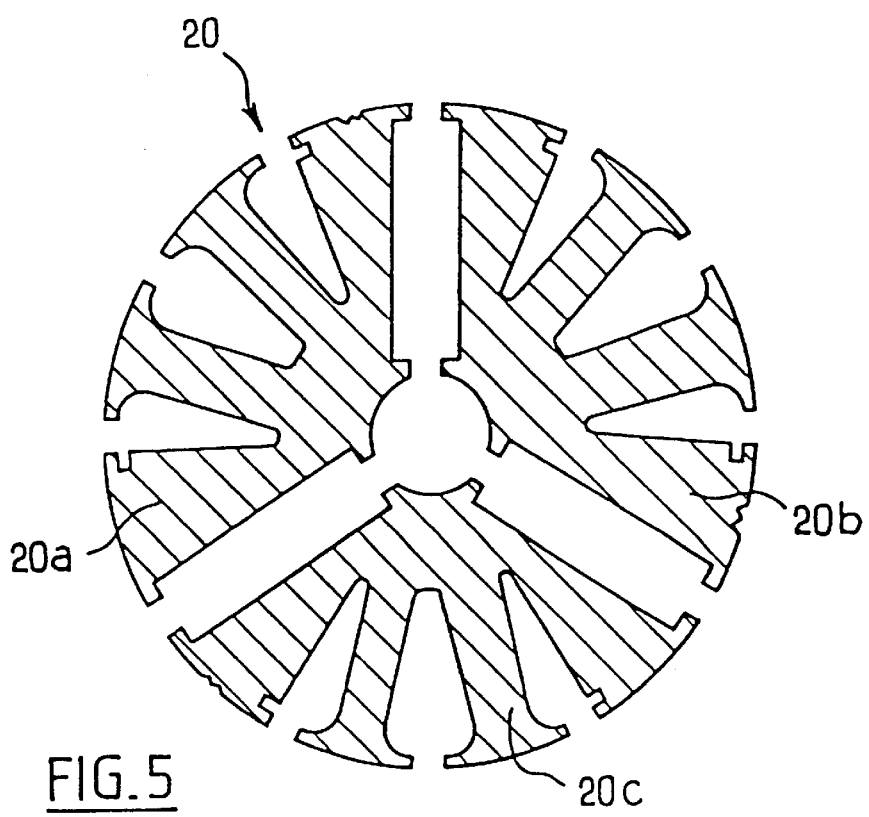
FIG. 5 is a diagrammatic view in cross-section of one embodiment of the core of the rotor from FIG. 3.

In FIG. 5 there are three sectors 20a, 20b and 20c joined together with three magnets to form the rotor.

This separation of the rotor into N sectors (N varying with the required number of poles) is advantageous in that it facilitates manufacture of the coils, the various sectors being easier to wind separately than a single cylindrical core.

Note another advantage of this invention: because the magnetic flux from the magnets is closed on itself when there is no excitation current, there is no risk of the rotor sticking to ferromagnetic members that may happen to be on the assembly line during assembly of the machine.

Of course, the present invention is not limited to the embodiments described and shown and the skilled person will know how to vary or modify them in any way within the spirit of the invention.

In particular, any combination of magnet structures and coil structures can be provided in the rotor, for example two coil structures or more between each pair of magnet structures, or two magnet structures or more between each pair of coil structures.

In this case the coils and magnets are designed so that the maximum flux of the coils can block most of the circumferential flux generated by the magnets in the absence of any excitation current.

Each coil structure can include only one judiciously disposed coil.

Each magnet structure can have two or more magnets, the fluxes from which combine to obtain the required effect of a circumferential flux in the rotor in the absence of any excitation by the coils.

What is claimed is:

1. A flux commutating electrical machine including a stator and a rotor wherein said stator includes at least one armature coil housed in at least one pair of notches, said rotor includes means for selectively establishing closed magnetic circuits around sections of said at least one armature coil including at least one excitation permanent magnet adapted to establish a magnetic flux closing on itself in a circumferential direction of said rotor and at least one excitation coil adapted to establish a localized variable magnetic flux in an opposite circumferential direction to that of the flux produced by said magnets, said magnet or each magnet is housed in a first rotor part defining a first pair of rotor poles, said coil is or said coils are disposed around a second rotor part ends of which define a second pair of rotor poles, said rotor further includes at least one third rotor part disposed between said adjacent first and second rotor parts, said at least one first rotor part, said at least one second rotor part, and said at least one third rotor part form a circumferential magnetic conduction path for the magnetic flux established by said at least one permanent magnet.

2. An electrical machine according to claim 1 wherein said second rotor part or each second rotor part has two excitation coils adapted to create magnetic fluxes one of which is directed towards the interior of said rotor and the other of which is directed towards the exterior of said rotor.

3. An electrical machine according to claim 1 wherein said rotor has along its periphery an alternating series of first parts and second parts.

4. An electrical machine according to claim 1 wherein said second rotor part or each second rotor part is generally U-shape and receives an excitation coil on each of its two branches.

5. An electrical machine according to claim 1 wherein said third rotor parts are at a distance from said rotor poles and extend a radial distance significantly less than the radius of said rotor.

6. An electrical machine according to claim 1 wherein said first, second and third rotor parts are defined by a single core.

7. An electrical machine according to claim 1 wherein said rotor is formed by at least two separate yoke elements between respective pairs of magnets and joined together by said magnets.

8. An electrical machine according to claim 1 in the form of a motor vehicle alternator.

\* \* \* \* \*